(12) United States Patent
Kikkawa

(10) Patent No.: US 11,026,771 B2
(45) Date of Patent: Jun. 8, 2021

(54) INTERDENTAL CLEANING INSTRUMENT

(71) Applicant: KOBAYASHI PHARMACEUTICAL CO., LTD., Osaka (JP)

(72) Inventor: Tasuku Kikkawa, Osaka (JP)

(73) Assignee: KOBAYASHI PHARMACEUTICAL CO., LTD., Osaka (JP)

( * ) Notice: Subject to any disclaimer, the term of this patent is extended or adjusted under 35 U.S.C. 154(b) by 646 days.

(21) Appl. No.: 15/542,501

(22) PCT Filed: Jun. 25, 2015

(86) PCT No.: PCT/JP2015/068407
§ 371 (c)(1),
(2) Date: Jul. 10, 2017

(87) PCT Pub. No.: WO2016/113928
PCT Pub. Date: Jul. 21, 2016

(65) Prior Publication Data
US 2018/0263741 A1    Sep. 20, 2018

(30) Foreign Application Priority Data

Jan. 16, 2015 (JP) .............................. JP2015-006487

(51) Int. Cl.
*A61C 15/00* (2006.01)
*A61C 15/02* (2006.01)
*A46B 5/00* (2006.01)

(52) U.S. Cl.
CPC .............. *A61C 15/02* (2013.01); *A46B 5/00* (2013.01); *A46B 2200/108* (2013.01); *A61C 2201/00* (2013.01)

(58) Field of Classification Search
CPC ....... A61C 15/046; A61C 15/02; A61C 15/00; A61C 15/0071; A61C 15/0069;
(Continued)

(56) References Cited

U.S. PATENT DOCUMENTS 6,082,999 A * 7/2000 Tcherny .................. A46B 9/04
132/308
6,085,761 A * 7/2000 Inaba ..................... A61C 15/02
132/329
(Continued)

FOREIGN PATENT DOCUMENTS

DE 102014001503 A1 * 8/2015 ............... A46B 1/00
EP 3569190 A1 * 11/2019 ............. A61C 15/02
(Continued)

OTHER PUBLICATIONS

The Geometry Center; http://www.geom.uiuc.edu/education/calc-init/static-beam/main_ideas.html (Year: 1996).*
(Continued)

*Primary Examiner* — Rachel R Steitz
(74) *Attorney, Agent, or Firm* — Kratz, Quintos & Hanson, LLP

(57) ABSTRACT

An interdental cleaning instrument is equipped with a base part and a cleaning part. The base part has a shaft part and a grip part. At least the shape of the base part is set in a manner such that a first pressing force required to press a portion spaced 2.5 mm apart from a tip of the cleaning part in 10 mm is 0.3 N or more and 1.4 N or less in a state in which a portion spaced 10 mm apart from the tip of the cleaning part is fixed, and a second pressing force required to press a portion spaced 8.0 mm apart from the tip of the cleaning part in 10 mm is 0.5 N or more and 2.5 N or less in a state in which a portion spaced 35 mm apart from the tip of the cleaning part is fixed.

4 Claims, 6 Drawing Sheets

(58) Field of Classification Search
CPC ...... A46B 2200/108; A46B 2200/1046; A46B 5/0033; A46B 15/0069; A46B 15/0071
USPC .................................. 132/329, 321; D28/65
See application file for complete search history.

(56) References Cited

U.S. PATENT DOCUMENTS

| | | | |
|---|---|---|---|
| 6,767,209 | B1 | 7/2004 | Tomita et al. |
| 10,195,005 | B2 * | 2/2019 | Wallstrom ............. A61C 15/02 |
| 2014/0075698 | A1 * | 3/2014 | Lui .......................... A46B 1/00 15/167.2 |
| 2014/0178650 | A1 | 6/2014 | Schnurr |
| 2015/0114428 | A1 * | 4/2015 | Kato ................... B29C 45/2669 132/329 |
| 2015/0335141 | A1 | 11/2015 | Schar et al. |
| 2016/0155770 | A1 | 6/2016 | Kim |
| 2018/0193119 | A1 * | 7/2018 | Butz .................... A46B 5/0037 |
| 2019/0274799 | A2 * | 9/2019 | Kato ...................... A46B 3/005 |

FOREIGN PATENT DOCUMENTS

| | | | | |
|---|---|---|---|---|
| GB | 2979577 | A1 * | 2/2016 | ............... A46B 3/18 |
| JP | 2000-166945 | A | 6/2000 | |
| WO | 2013-176297 | A1 | 11/2013 | |
| WO | 2014-065368 | | 5/2014 | |
| WO | WO-2014065368 | A1 * | 5/2014 | ........... A46D 1/0207 |
| WO | 2015/005659 | A1 | 1/2015 | |
| WO | WO-2015147076 | A1 * | 10/2015 | ............. B05D 3/108 |
| WO | WO-2016076241 | A1 * | 5/2016 | ............. A61C 15/02 |
| WO | WO-2016199833 | A1 * | 12/2016 | ............. A61C 15/02 |
| WO | 2014-005659 | A1 | 1/2017 | |
| WO | WO-2019131643 | A1 * | 7/2019 | ............. A61C 15/02 |

OTHER PUBLICATIONS

Engineering ToolBox; https://www.engineeringtoolbox.com/cantilever-beams-d_1848.html (Year: 2015).*

* cited by examiner

INTERDENTAL CLEANING INSTRUMENT

CROSS REFERENCE TO RELATED APPLICATIONS

This application is a 371 National Stage application of PCT/JP2015/068407, which has an international filing date Jun. 25, 2015, which claims priority to Japanese Patent Application No. 2015-006847, filed Jan. 16, 2015, which are hereby incorporated herein by reference in their entirety.

TECHNICAL FIELD

The present invention relates to an interdental cleaning instrument.

BACKGROUND ART

An interdental cleaning instrument for cleaning an interdental space is known. For example, Patent Literature 1 discloses an interdental cleaning instrument including a base part having a shape extending in a specific direction and a cleaning part composed of an elastomer having a hardness lower than the hardness of the base part. The base part has a shaft part having a shape that can be inserted into an interdental space and a grip part having a shape that can be gripped by fingers. The cleaning part has a shape covering an outer peripheral surface of the shaft part. The shaft part is formed in a shape extending along the specific direction and having a strength that enables cleaning of the interdental space with the cleaning part.

In this interdental cleaning instrument, contamination between the teeth is removed by friction occurring between the teeth and the cleaning part composed of an elastomer having a hardness lower than the hardness of the shaft part.

In the interdental cleaning instrument such as described in Patent Literature 1, it is more difficult to clean the space between mutually adjacent back teeth than the space between mutually adjacent front teeth. Specifically, since the space between the back teeth extends in a direction intersecting the direction from the front teeth side to the back teeth side in the oral cavity, where the cleaning part is inserted along the direction from the front teeth side to the back teeth side, the tip of the cleaning part comes into contact with the outer surface of the back teeth. Therefore, in order to insert the cleaning part to the back of the teeth between the back teeth, it is necessary to perform the operation of adjusting the insertion direction of the cleaning part into the interdental space, that is, the operation of adjusting the posture of the shaft part so that the longitudinal direction of the cleaning part coincides with the extension direction of the space between the back teeth when the tip of the cleaning part comes into contact with the outer surface of the back teeth. However, since this operation is restricted by the lips, it is difficult to insert the cleaning part in the space between the back teeth (it is difficult to clean the interdental space).

CITATION LIST

Patent Literature

Patent Literature 1: WO 2014/065368

SUMMARY OF INVENTION

An object of the present invention is to provide an interdental cleaning instrument that enables easy insertion of a cleaning part in the space between back teeth.

In order to solve the aforementioned problem, it is conceivable to reduce the strength of the shaft part. In this way, after the tip of the cleaning part comes into contact with the outer surface of the back teeth, the shaft part is inserted in the present posture thereof back into the oral cavity, so that the cleaning part is inserted while the shaft part is flexurally deformed so that the tip of the shaft part (the tip of the cleaning part) is directed towards the back of the space between the back teeth. Therefore, the operation of adjusting the posture of the shaft part when the tip of the cleaning part is in contact with the outer surface of the back teeth is not required. However, when the strength of the shaft part is reduced, the elastic restoring force of the shaft part during the insertion of the cleaning part in the space between the back teeth, that is, the force pressing the cleaning part against the outer surface of the back teeth is reduced. As a result, the ability to clean the interdental space and the back teeth is reduced. Further, where the strength of the shaft part is too low, when the shaft part is further inserted in the present posture thereof from the state in which the tip of the cleaning part is in contact with the outer surface of the back teeth toward the back of the oral cavity, flexural deformation of the shaft part such that the tip of the shaft part is directed towards the back of the space between the back teeth is less likely to occur.

Accordingly, the inventors of the present invention have conceived of the possibility of improving both the insertability of the cleaning part into the space between the back teeth and the cleaning property of the interdental space by setting the strength of the portion of the base part that is located relatively close to the insertion end section of the shaft part and the strength of the portion of the base part that is located relatively far from the insertion end section of the shaft part within the respective specific ranges.

The present invention has been completed from such a viewpoint. Specifically, the interdental cleaning instrument according to one aspect of the present invention includes: a base part having a shape extending in a specific direction; and a cleaning part that is composed of an elastomer having a hardness lower than the hardness of the base part, covers at least a portion of the base part, and is capable of cleaning an interdental space, wherein the base part has a shaft part which has a shape that can be inserted in the interdental space, and has an insertion end section formed at one end in the specific direction and a base end section formed at the other end in the specific direction, and a grip part that extends from the base end section along the specific direction so as to be spaced apart from the shaft part and has a shape that can be grasped by fingers; the shaft part has a shape that can be flexurally deformed so as to allow for a displacement of the insertion end section in an axially perpendicular direction, which is perpendicular to an axial direction of the shaft part, with respect to the base end section; the cleaning part has a shape that covers a portion of the shaft part, the portion including the insertion end section and having a dimension equal to or less than a dimension of the shaft part in the axial direction; a dimension of the base part in the axial direction is set to 35 mm or more; and at least the shape of the base part is set such that a first pressing force required to press a portion spaced 2.5 mm apart from a tip of the cleaning part in the interdental cleaning instrument to the grip part side in 10 mm vertically downward is 0.3 N or more and 1.4 N or less in a state in which a portion spaced 10 mm apart from the tip of the cleaning part in the interdental cleaning instrument to the grip part side is fixed in a posture in which the axial direction is parallel to a horizontal direction, and a second pressing force required to press a portion spaced 8.0 mm apart from the tip of the cleaning part in the interdental cleaning instrument to the grip part side in 10 mm vertically downward is 0.5 N or more and 2.5 N or less in a state in which a portion spaced 35 mm apart from the tip of the cleaning part in the interdental cleaning instrument to the grip part side is fixed in a posture in which the axial direction is parallel to a horizontal direction.

DESCRIPTION OF EMBODIMENTS

An interdental cleaning instrument 1 according to one embodiment of the present invention will be described with reference to FIGS. 1 to 6.

Figure 1:
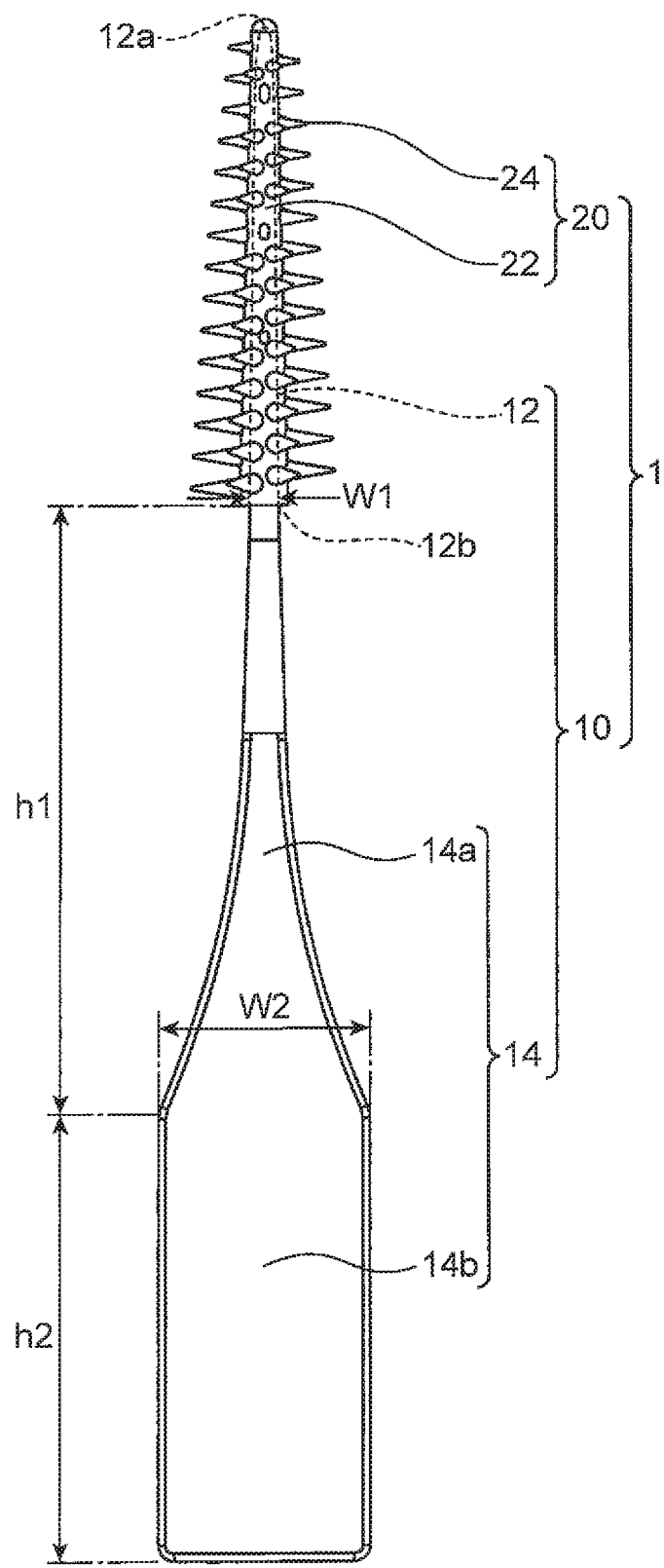
FIG. 1 is a front view of an interdental cleaning instrument according to one embodiment of the present invention.

The present interdental cleaning instrument 1, as shown in FIG. 1, includes a base part 10 and a cleaning part 20 composed of an elastomer having a hardness less than the hardness of the base part 10. The base part 10 is preferably formed of a synthetic resin such as polypropylene, ABS, polybutylene terephthalate, a polycarbonate, polyethylene terephthalate, polystyrene, and a polyacetal. In the present embodiment, the base part 10 is formed of polypropylene. As the elastomer, a styrene elastomer is used. However, a silicone, an olefin elastomer, a polyester elastomer or the like may be used as the elastomer.

The base part 10 has a shape extending linearly along a specific direction (vertical direction in FIG. 1). In the present embodiment, the dimension of the base part 10 in the specific direction is set to 47.5 mm. The base part 10 has a shaft part 12 and a grip part 14.

Figure 2:
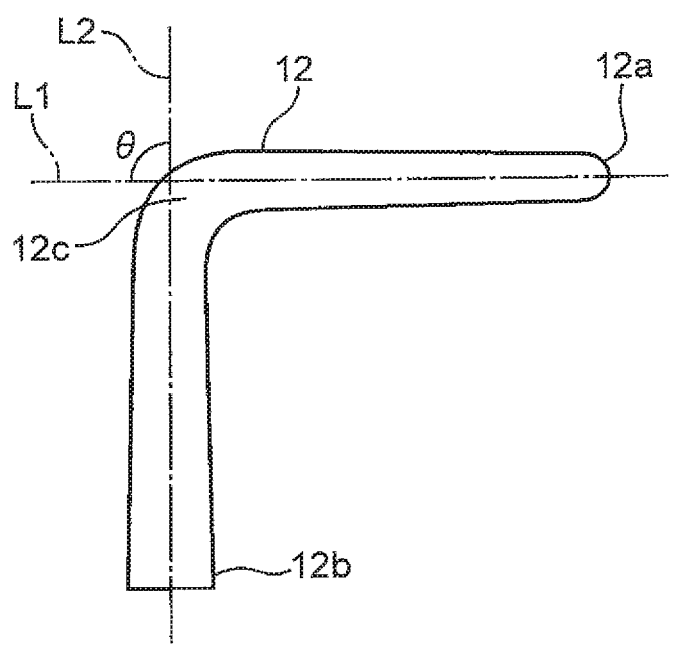
FIG. 2 is a diagram schematically showing a state in which the shaft part is in a curved posture.

The shaft part 12 has a shape that can be inserted into an interdental space. The shaft part 12 has an insertion end section 12a formed at one end in the specific direction and a base end section 12b formed at the other end in the specific direction. The shaft part 12 has such a shape that can be flexurally deformed so that the insertion end section 12a is displaced in an axially perpendicular direction (lateral direction in FIG. 1) that is perpendicular to the axial direction of the shaft part 12, with the base end section 12b as a fulcrum. The shaft part 12 has a shape that can be deformed at any point of an intermediate portion 12c located between the insertion end section 12a and the base end section 12b of the shaft part 12 so as to allow the displacement of the insertion end section 12a at least between a steady-state posture (posture shown in FIG. 1) and a curved posture (posture shown in FIG. 2). The steady-state posture is a posture of the shaft part 12 when no external force acts on the shaft part 12. The curved posture, as shown in FIG. 2, is a posture in which an angle θ between a first straight line L1 connecting the deformed point of the intermediate portion 12c and the insertion end section 12a and a second straight line L2 connecting the deformed point of the intermediate portion 12c and the base end section 12b is 90 degrees. The shaft part 12 is also formed in a shape such that the maximum displacement portion in which the amount of displacement from an initial position of the center axis of the shaft part 12 before buckling of the shaft part 12, in the axially perpendicular direction is at a maximum when the buckling occurs in the shaft part 12 is located between a portion of the shaft part 12 which is spaced 1.0 mm apart from the insertion end section 12a toward the base end section 12b side and a portion of the shaft part 12 which is spaced 9.0 mm apart from the insertion end section 12a toward the base end section 12b side. In the present embodiment, the shaft part 12 is formed in a substantially cylindrical shape. Specifically, the shaft part 12 is formed in a shape such that the outer diameter of the shaft part 12 gradually and slightly reduces from the base end section 12b toward the insertion end section 12a. In the present embodiment, the diameter of the base end section 12b is set to 1.1 mm and the diameter of the insertion end section 12a is set to 0.55 mm. Further, the dimension of the shaft part 12 in the axial direction is set to 15 mm. The maximum displacement portion is located at a position spaced 6 mm apart from the insertion end section 12a toward the base end section 12b side in the shaft part 12.

The grip part 14 has a shape that extends from the base end section 12b in a direction apart from the shaft part 12 (downward in FIG. 1) along the axial direction and that can be grasped with the fingers. The shape of the grip part 14 is set such that buckling occurs in the shaft part 12 when a compressive load is applied to the base part 10 from both sides in the axial direction. In the present embodiment, the dimension of the grip part 14 in the axial direction is set to 32.5 mm. The grip part 14 has a support part 14a that supports the shaft part 12, and a grip-part body 14b connected to the support part 14a.

The support part 14a is connected to the base end section 12b. The support part 14a has a shape such that the dimension of the support part 14a in the axially perpendicular direction gradually increases with the distance from the base end section 12b. In the present embodiment, the support part 14a has a shape such that the dimension of the support part 14a in the axially perpendicular direction gradually increases with the distance from the base end section 12b and such that curves so as to be convex inward in the axially perpendicular direction. It is preferable that a dimension w2 of the connecting portion between the support part 14a and the grip-part body 14b in the axially perpendicular direction be set to 1 time or more and 25 times or less the dimension (outer diameter) w1 of the base end section 12b in the same direction. In the present embodiment, the dimension w2 is set to 6.3 times the dimension w1, that is, to 6.93 mm. Further, a dimension h1 of the support part 14a in the axial direction is set to 19 mm.

The grip-part body 14b is formed in a rectangular shape. In the present embodiment, the dimension of the grip-part body 14b in the axially perpendicular direction is set to be the same as the dimension w2, and a dimension h2 of the grip-part body 14b in the axial direction is set to 13.5 mm. Further, this shape of the grip-part body 14b is not limiting.

The cleaning part 20 has a shape that covers a portion of the shaft part 12, the portion including the insertion end section 12a and having a dimension equal to or smaller than the dimension of the shaft part 12 in the axial direction, and is capable of cleaning an interdental space. In the present embodiment, the cleaning part 20 has a shape covering the entire outer peripheral surface of the shaft part 12. Thus, the cleaning part 20 has a shape covering the maximum displacement portion. The cleaning part 20 has a cleaning-part body 22 and a plurality of brush bristles 24.

The cleaning-part body 22 has a shape covering the entire outer peripheral surface of the shaft part 12. The cleaning-part body 22 has a cylindrical outer peripheral surface. The thickness of the cleaning-part body 22 is set to be smaller than the diameter of the shaft part 12.

Each brush bristle 24 is integrally formed with the cleaning-part body 22 of the same material, protrudes outward in the axially perpendicular direction from the outer peripheral surface of the cleaning-part body 22, and has a shape such that the outer shape of the brush bristles 24 gradually decreases with the distance from the outer peripheral surface of the cleaning-part body 22. In the present embodiment, each brush bristle 24 is formed in a conical shape.

In the present embodiment, the shape of the base part 10 is set such that a first pressing force corresponding to the strength of a tip-side portion 1a (see FIG. 3) of the base part 10 which is located relatively close to the insertion end section 12a is 0.3 N or more and 1.4 N or less and a second pressing force corresponding to the strength of a grip part-side portion 1b (see FIG. 4) of the base part 10 which is located relatively far from the insertion end section 12a is 0.5 N or more and 2.5 N or less. It is more preferable that the shape of the base part 10 be set so that the first pressing force is 0.5 N or more and 1.4 N or less and the second pressing force is 0.80 N or more and 2.5 N or less. In the present embodiment, the shape of the base part 10 is set such that the first pressing force is 1.3 N and the second pressing force is 1.4 N.

The first pressing force is a force required to press a portion spaced 2.5 mm apart from the tip of the cleaning part 20 in the interdental cleaning instrument 1 to the grip part 14 side in 10 mm vertically downward in a state in which a portion spaced 10 mm apart from the tip of the cleaning part 20 in the interdental cleaning instrument 1 to the grip part 14 side is fixed in a posture in which the axial direction is parallel to the horizontal direction. In other words, the tip-side portion 1a corresponds to a portion between the portion of spaced 2.5 mm apart from the tip of the interdental cleaning instrument 1 and the portion spaced 10 mm apart from the tip. Therefore, the strength (first pressing force) of the tip-side portion 1a can be adjusted by the shape of the portion of the base part 10 spaced 2.5 mm apart from the tip and the portion spaced 10 mm apart from the tip, that is, mainly by the shape of the shaft part 12. In the present embodiment, the shaft part 12 is formed in a substantially cylindrical shape. The diameter of the insertion end section 12a is set to 0.55 mm, the diameter of the base end section 12b is set to 11 mm, and the dimension of the shaft part 12 in the axial direction is set to 15 mm.

The second pressing force is a force required to press a portion spaced 8.0 mm apart from the tip of the cleaning part 20 in the interdental cleaning instrument 1 to the grip part 14 side in 10 mm vertically downward in a state in which a portion spaced 35 mm apart from the tip of the cleaning part 20 in the interdental cleaning instrument 1 to the grip part 14 side is fixed in a posture in which the axial direction is parallel to the horizontal direction. In other words, the grip part-side portion 1b corresponds to a portion between the portion spaced 8.0 mm apart from the tip of the interdental cleaning instrument 1 and the portion spaced 35 mm apart from the tip. Therefore, the strength (second pressing force) of the grip part-side portion 1b can be adjusted by the shape of the portion between the portion of the base part 10 spaced 8.0 mm apart from the tip and the portion spaced 35 mm apart from the tip, that is, mainly by the shape of the support part 14a. In the present embodiment, the support part 14a has a shape such that the dimension of the support part 14a in the axially perpendicular direction gradually increases with the distance from the base end section 12b and such that curves so as to be convex inward in the axially perpendicular direction. Further, the dimension h1 of the support part 14a in the axial direction is set to 19 mm, and the dimension w2 of the connecting portion between the support part 14a and the grip-part body 14b in the axially perpendicular direction is set to 6.3 times the dimension (outer diameter) w1 of the base end section 12b in the same direction.

Figure 3:
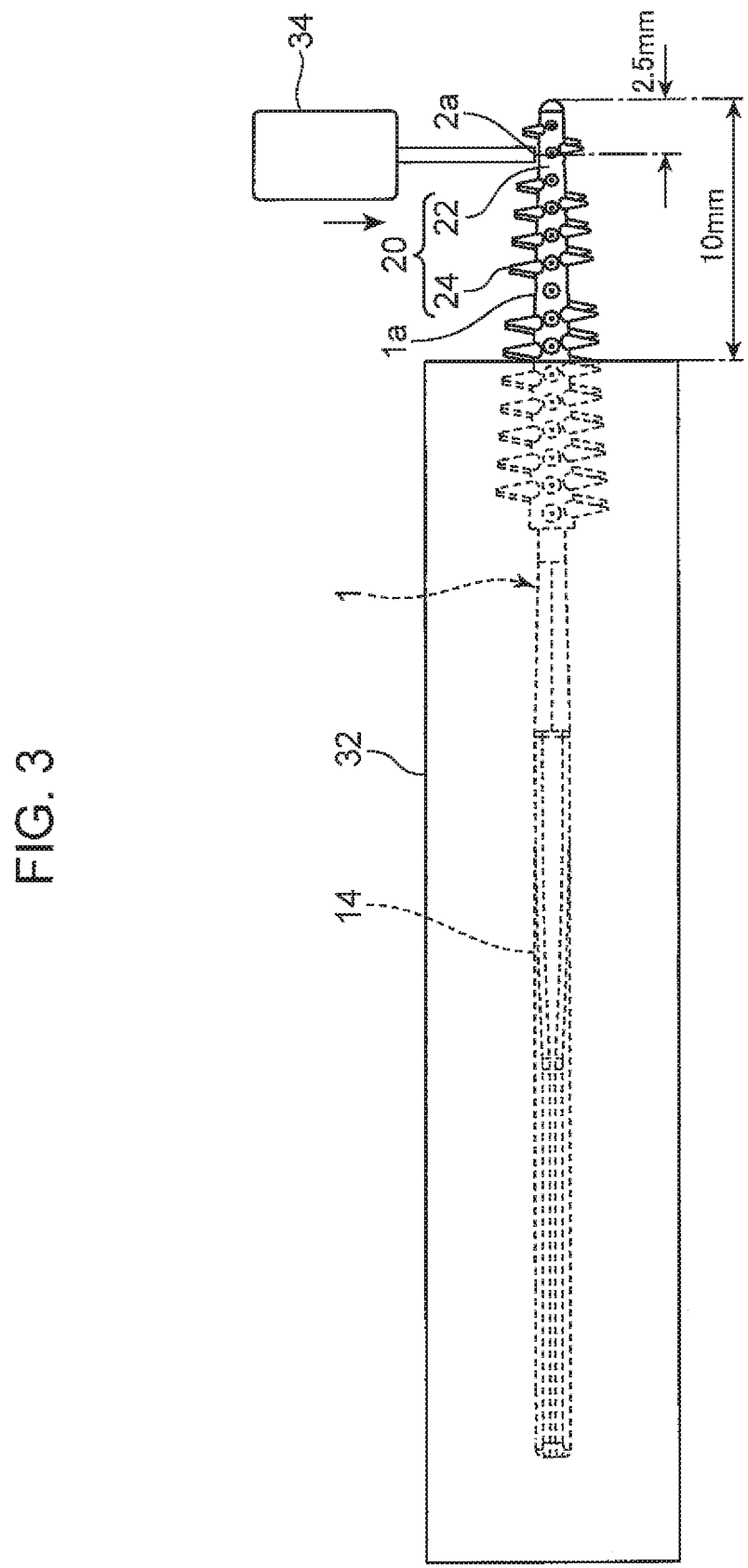
FIG. 3 is a diagram schematically showing a method for measuring the first pressing force.
Figure 4:
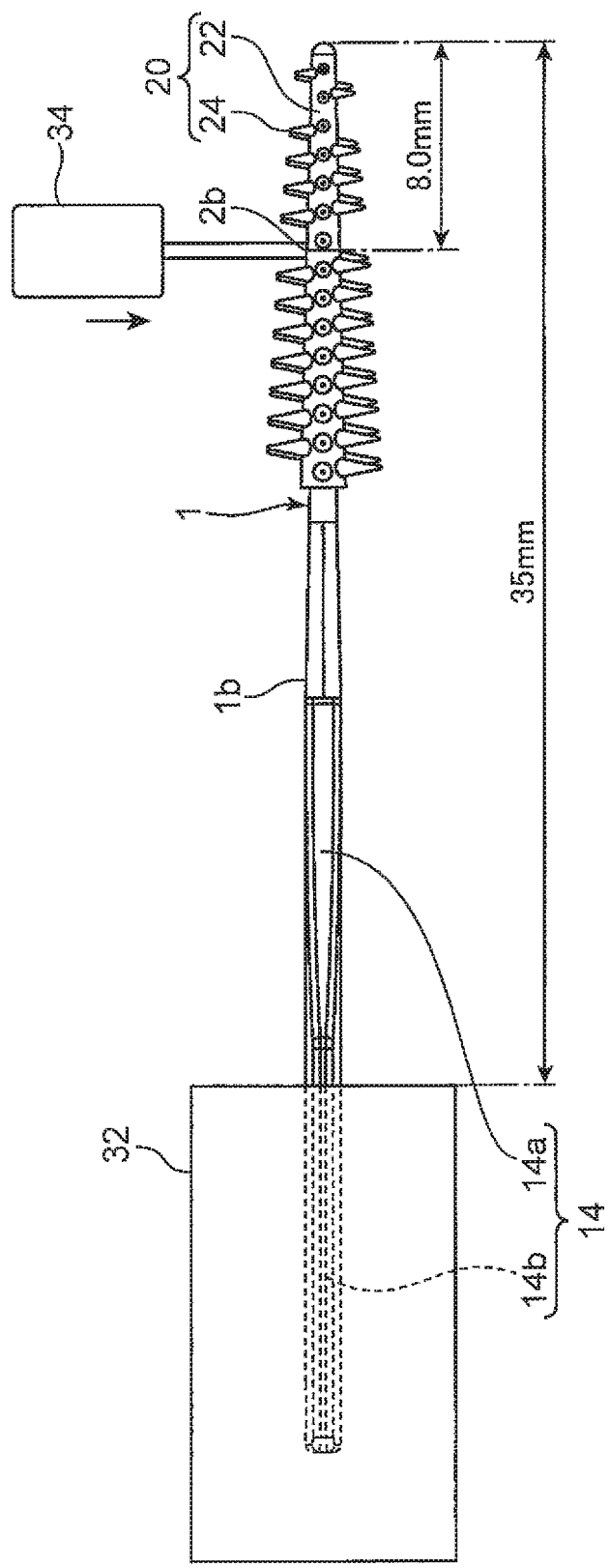
FIG. 4 is a diagram schematically showing a method for measuring the second pressing force.

As shown in FIGS. 3 and 4, the first pressing force and the second pressing force are measured using a fixing instrument 32 capable of fixing the interdental cleaning instrument 1 in a posture in which the axial direction is horizontal, and a pressing force measuring part 34 capable of measuring the pressing force when pressing the interdental cleaning instrument 1.

First, a method for measuring the first pressing force will be described with reference to FIG. 3.

First, as shown in FIG. 3, the interdental cleaning instrument 1 is fixed to the fixing instrument 32 in a posture in which the axial direction (the direction connecting the shaft part 12 and the grip part 14) is horizontal. Specifically, in the posture in which the axial direction is parallel to the horizontal direction, the entire portion of the interdental cleaning instrument 1 that is separated from the tip of the cleaning part 20 by 10 mm or more toward the grip part 14 side is fixed to the fixing instrument 32.

Next, the pressing force measuring part 34 presses down a portion 2a (the tip part of the tip-side portion 1a) that is spaced 2.5 mm apart from the tip of the cleaning part 20 to the grip part 14 side of the interdental cleaning instrument 1. The pressing is done in a vertically downward reach of 10 mm. Specifically, the pressing force measuring part 34 is displaced for a vertically downward pressing in 10 mm from a state in which the pressing force measuring part 34 is in contact with the portion 2a. The pressing force measuring part 34 causes the tip-side portion 1a bearing the portion 2a to bend with the vertically downward pressing in 10 mm. The pressing force measuring part 34 measures a pressing force in this process, that is, the first pressing force. In the present embodiment, the first pressing force is 1.3 N.

A method for measuring the second pressing force will be described hereinbelow with reference to FIG. 4. This measuring method is the same as the method for measuring the first pressing force, except for the fixing location of the interdental cleaning instrument 1 with the fixing instrument 32 and the pressing location of the interdental cleaning instrument 1 with the pressing force measuring part 34.

Thus, in the posture in which the axial direction is parallel to the horizontal direction, the entire portion of the interdental cleaning instrument 1 that is spaced 35 mm or more apart from the tip of the cleaning part 20 toward the grip part 14 side is fixed to the fixing instrument 32. In this state, a portion 2b (the tip part of the grip part-side portion 1b) spaced 8.0 mm apart from the tip of the cleaning part 20 to the grip part 14 side in the interdental cleaning instrument 1 is pressed 10 mm vertically downward by the pressing force measuring part 34. Then, the pressing force at this time, that is, the second pressing force is measured by the pressing force measuring part 34. In the present embodiment, this second pressing force is 1.4 N.

The case where the space between the back teeth is cleaned with the interdental cleaning instrument 1 described above will be described hereinbelow.

The interdental cleaning instrument 1 is inserted into the oral cavity from the front teeth side towards the back teeth side with the cleaning part 20 as a head. Here, since the space between the back teeth extends in a direction intersecting the direction from the front teeth side to the back teeth side in the oral cavity, where the cleaning part 20 is inserted along the direction from the front teeth side to the back teeth side, the tip of the cleaning part 20 comes into contact with the outer surface of the back teeth.

Then, in the state in which the tip of the cleaning part 20 is in contact with the outer surface of the back teeth, the base part 10 is further inserted in the present posture thereof toward the back of the oral cavity. In the interdental cleaning instrument 1 of the present embodiment, the shape of the base part 10 is set such that the first pressing force corresponding to the strength of the tip-side portion 1a is 1.3 N and the second pressing force corresponding to the strength of the grip part-side portion 1b is 1.4 N. Therefore, the insertion of the cleaning part 20 into the space between the back teeth is facilitated. Specifically, as a result of setting the shape of the base part 10 so that the first pressing force is 0.3 N or more, the strength of the tip-side portion 1a is sufficiently ensured. Therefore, when the base part 10 is further inserted in the present posture thereof toward the back of the oral cavity from the state in which the tip of the cleaning part 20 is in contact with the outer surface of the back teeth, the tip-side portion 1a is effectively flexurally deformed toward the back of the interdental space. Meanwhile, as a result of setting the shape of the base part 10 so that the first pressing force is 1.4 N or less, it is possible to suppress the inadequate deformation (impairment of insertability of the cleaning part 20 into the back of the interdental space) of the tip-side portion 1a when the base part 10 is further inserted in the present posture thereof toward the back of the oral cavity from the state in which the tip-side portion 1a is in contact with the outer surface of the back teeth. Further, as a result of setting the shape of the base part 10 so that the second pressing force is 0.5 N or more, the tip-side portion 1a is effectively supported by the grip part-side portion 1b so as to allow for flexural deformation of the tip-side portion 1a.

Then, the base part 10 is further inserted in the present posture thereof toward the back of the oral cavity from the state in which the tip of the cleaning part 20 is inserted in the space between the back teeth. As a result, the angle formed by the first straight line L1 and the second straight line L2 is about 90 degrees, and the cleaning part 20 is inserted deep into the space between the back teeth while the shaft part 12 is deformed so that the intersection point of the straight lines L1 and L2 is displaced from the insertion end section 12a side toward the base end section 12b side. In the present interdental cleaning instrument 1, the shaft part 12 has a shape deformable at any point of the intermediate portion 12c so as to allow for the displacement of the insertion end section 12a between the steady posture and the curved posture. Therefore, it is possible to insert the cleaning part 20 to the back of the space between the back teeth while suppressing the breakage of the shaft part 12. Further, since the shape of the base part 10 is set such that the second pressing force is 0.5 N or more, the elastic restoring force of the base part 10 during the insertion of the cleaning part 20 in the space between the back teeth (the force pressing the cleaning part 20 against the outer surface of the back teeth), that is, the cleaning property of the interdental space or the back teeth is sufficiently ensured. Furthermore, since the shape of the base part 10 is set such that the second pressing force is 2.5 N or less, the elastic restoring force of the base part 10 is prevented from becoming too large. For this reason, the cleaning part 20 is easily inserted to the back of the space between the back teeth, thereby effectively cleaning the interdental space or the back teeth.

Further, the cleaning part 20 has a shape covering the maximum displacement portion of the shaft part 12. Therefore, even when the shaft part 12 is broken at the maximum displacement portion as a result of buckling of the shaft part 12 during cleaning of the interdental space, the portion of the shaft part 12 between the maximum displacement portion and the insertion end section 12a is prevented from being detached from other portions of the base part 10. Thus, even when buckling occurs in the shaft part 12 during the cleaning of the interdental space, a part of the shaft part 12 is prevented from remaining in the oral cavity.

This is not limited to the case where the shape of the base part 10 is set such that the first pressing force and the second pressing force fall within the above ranges. Thus, the problem that a part of the shaft part 12 remains in the oral cavity when buckling occurs in the shaft part 12 during the cleaning of the interdental space can arise irrespective of the value of the first pressing force and the value of the second pressing force. By contrast, the above problem can be solved by setting the shape of the grip part 14 so that buckling occurs in the shaft part 12 when a compressive load is applied to the base part 10 from both sides in the axial direction, and by forming the cleaning part 20 in a shape that covers the maximum displacement portion.

Further, the shaft part 12 is formed in a shape such that the maximum displacement portion is located at a distance of 6 mm from the insertion end section 12a toward the base end section 12b side. Therefore, even when the shaft part 12 is buckled during cleaning of the interdental space, the teeth can be cleaned by the portion of the cleaning part 20 that covers the portion of the shaft part 12 between the maximum displacement portion and the insertion end section 12a.

It is to be understood that the presently disclosed embodiment is exemplary rather than restrictive in all the aspects thereof. The scope of the present invention is represented by the claims, rather than by the description of the embodiment described hereinabove, and is inclusive of meanings and scopes equivalent to those of the claims.

Figure 5:
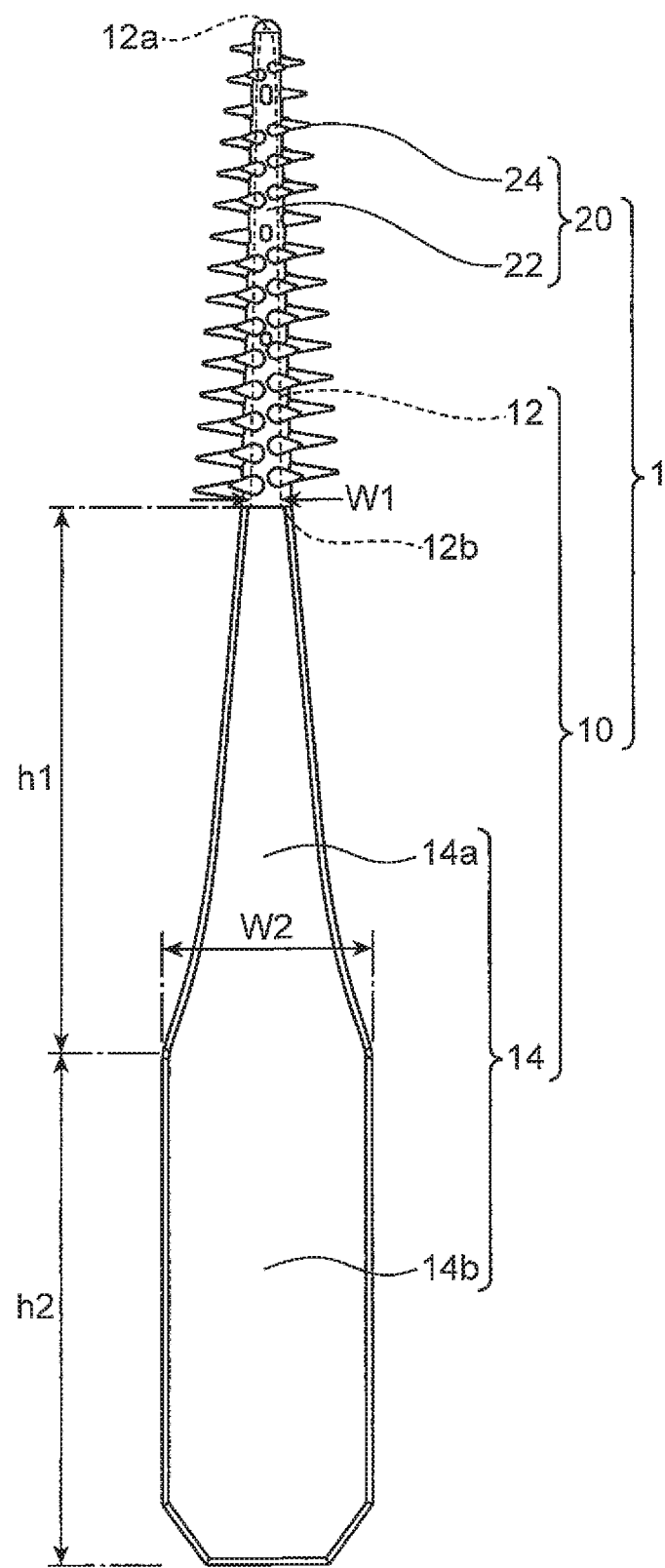
FIG. 5 is a front view showing a modified example of the base part.
Figure 6:
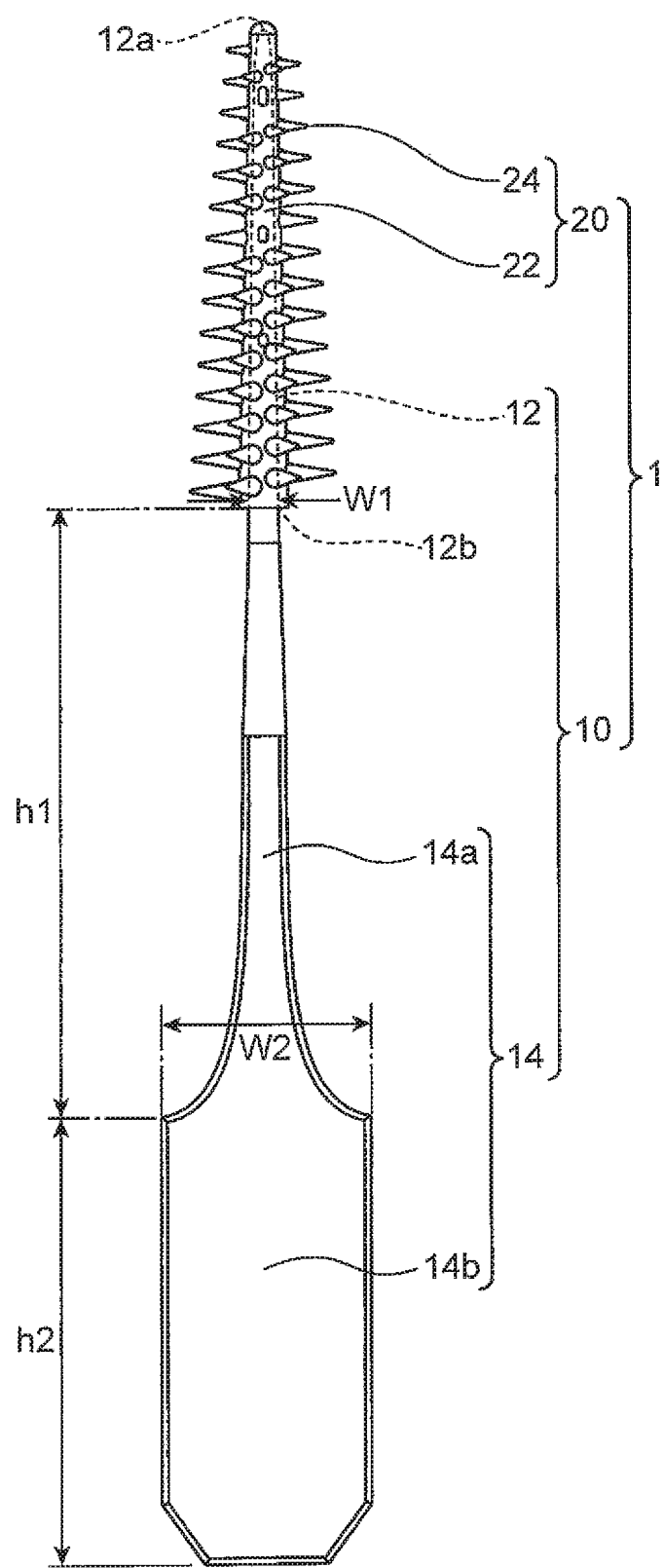
FIG. 6 is a front view showing a modified example of the base part.

The shape of the base part 10 is not limited to the abovementioned example. The shape of the base part 10 can be changed variously within a range where the condition of the first pressing force being 0.3 N or more and 1.4 N or less and the second pressing force being 0.5 N or more and 2.5 N or less is fulfilled. For example, as shown in FIG. 5, the shape of the grip part 14 may be set so that the dimension h1 of the support part 14a in the axial direction is 17 mm and the dimension h2 of the grip-part body 14b in the axial direction is 15.5 mm. In this example, the radius of curvature of the outer end portion of the support part 14a in the axially perpendicular direction is larger than that in the embodiment. Alternatively, as shown in FIG. 6, the dimension h1 of the support part 14a in the axial direction and the dimension h2 of the grip-part body 14b in the axial direction may be set to be the same as those in the embodiment, and the shape of the grip part 14 (support part 14a) may be set so that the radius of curvature of the outer end portion of the support part 14a in the axially perpendicular direction is less than that in the embodiment.

Further, the first pressing force and the second pressing force can also be adjusted by the synthetic resin constituting the base part 10. In addition, the first pressing force and the second pressing force may be adjusted by covering the grip part 14 with the elastomer.

EXAMPLES

Five examples of the interdental cleaning instrument 1 of the above embodiment were fabricated, and an evaluation test on the insertability into the space between the back teeth and the cleaning property between the teeth was performed.

Example 1 is the interdental cleaning instrument 1 of the above embodiment. In Example 2, in the interdental cleaning instrument 1 shown in FIG. 5, the grip part 14 is also covered with the styrene elastomer. Example 3 is the interdental cleaning instrument 1 shown in FIG. 6. In these Examples 1 to 3, the base part 10 was formed of polypropylene, and the cleaning part 20 was formed of a styrene elastomer having a Shore A hardness of A40.

Example 4 is an instrument of the same shape as the interdental cleaning instrument 1 shown in FIG. 6; in this instrument, the base part 10 is formed of an ABS resin and the cleaning part 20 is formed of a styrene elastomer having a Shore A hardness of A40. Example 5 is an instrument of the same shape as the interdental cleaning instrument 1 shown in FIG. 6; in this instrument, the base part 10 is formed of a polybutylene terephthalate (PBT) resin and the cleaning part 20 is formed of a silicone having a Shore A hardness of A40.

The test results of each example are shown in Table 1.

TABLE 1

|  | First pressing force [N] | Second pressing force [N] | Insertability into interdental space | Cleaning property of back teeth |
|---|---|---|---|---|
| Example 1 | 1.3 | 1.4 | ⊗ | ⊗ |
| Example 2 | 0.5 | 2.2 | ⊗ | ⊗ |
| Example 3 | 1.4 | 0.8 | ○ | ○ |
| Example 4 | 1 | 0.5 | Δ | Δ |
| Example 5 | 0.3 | 1.1 | Δ | ○ |

The interdental cleaning instruments were actually used by five test subjects, and the insertability into the space between the back teeth and the cleaning property between the teeth were evaluated. The evaluation was performed by conducting a questionnaire-based survey according to Visual Analogue Scale with scores between 0 and 3 points according to the following criteria. The evaluation results are summarized by rounding off the first decimal place of the questionnaire result.

<Insertability>
0 points: difficult to insert
3 points: easy to insert
<Cleaning property>
0 points: low cleaning effect
3 points: high cleaning effect In the table, the results with a total point score of 13 to 15 for five people are displayed as "⊗", those with 10 to 12 as "○", and those with 5 to 9 as "Δ".

According to the test results, it is clear that because both the condition that the first pressing force is 0.3 N or more and 1.4 N or less and the condition that the second pressing force is 0.5 N or more and 2.5 N or less are satisfied in each example, the insertability and the cleaning property are good. Further, the results of Examples 3 to 5 also indicate that the first pressing force and the second pressing force can be adjusted also by the synthetic resin constituting the base part 10.

In Example 4, although the first pressing force is 1 N, since the second pressing force is 0.5 N, that is, the strength of the grip part-side portion 1b is somewhat low, the insertability and the cleaning property are both evaluated as "Δ".

In Example 5, although the cleaning property is high because the second pressing force is 1.1 N, since the first pressing force is 0.3 N, that is, the strength of the tip-side portion 1a is somewhat low, the evaluation of the insertability is "Δ".

Although the results are not shown, when the first pressing force exceeded 1.4 N, the total point score of the evaluation of at least the insertability into the interdental space became 4 or less, when the second pressing force was less than 0.3 N, the total point score of the evaluation of both the insertability into the interdental space and the cleaning property became 4 or less, and when the second pressing force exceeded 2.5 N, the total point score of the evaluation of at least the insertability into the interdental space was 4 or less.

Here, the above embodiment will be outlined.

The interdental cleaning instrument of the present embodiment includes: a base part having a shape extending in a specific direction; and a cleaning part that is composed of an elastomer having a hardness lower than the hardness of the base part, covers at least a portion of the base part, and is capable of cleaning an interdental space, wherein the base part has a shaft part which has a shape that allows to be inserted in the interdental space, and has an insertion end section formed at one end in the specific direction and a base end section formed at the other end in the specific direction, and a grip part that extends from the base end section along the specific direction so as to be spaced apart from the shaft part and has a shape that can be grasped by fingers; the shaft part has a shape that can be flexurally deformed so as to allow for a displacement of the insertion end section in an axially perpendicular direction, which is perpendicular to an axial direction of the shaft part, with respect to the base end section; the cleaning part has a shape that covers a portion of the shaft part, the portion including the insertion end section and having a dimension equal to or less than a dimension of the shaft part in the axial direction; a dimension of the base part in the axial direction is set to 35 mm or more; and at least the shape of the base part is set such that a first pressing force required to press a portion spaced 2.5 mm apart from a tip of the cleaning part in the interdental cleaning instrument to the grip part side in 10 mm vertically downward is 0.3 N or more and 1.4 N or less in a state in which a portion spaced 10 mm apart from the tip of the cleaning part in the interdental cleaning instrument to the grip part side is fixed in a posture in which the axial direction is parallel to a horizontal direction, and a second pressing force required to press a portion spaced 8.0 mm apart from the tip of the cleaning part in the interdental cleaning instrument to the grip part side in 10 mm vertically downward is 0.5 N or more and 2.5 N or less in a state in which a portion spaced 35 mm apart from the tip of the cleaning part in the interdental cleaning instrument to the grip part side is fixed in a posture in which the axial direction is parallel to a horizontal direction.

In the present interdental cleaning instrument, the shape of the base part is set such that the first pressing force corresponding to the strength of the tip-side portion of the base part which is located relatively close to the insertion end section is 0.3 N or more and 1.4 N or less and the second pressing force corresponding to the strength of the grip part-side portion of the base part which is located relatively far from the insertion end section is 0.5 N or more. Therefore, the insertion of the cleaning part into the space between the back teeth is facilitated. Furthermore, since the shape of the base part is set such that the second pressing force is 2.5 N or less, the interdental space is effectively cleaned by the cleaning part during the insertion of the cleaning part into the interdental space. Specifically, as a result of setting the shape of the base part so that the first pressing force is 0.3 N or more, the strength of the tip-side portion is sufficiently ensured so that the tip-side portion is effectively flexurally deformed toward the back of the interdental space when the base part is further inserted in the present posture thereof toward the back of the oral cavity from the state in which the tip of the cleaning part is in contact with the outer surface of the back teeth. Meanwhile, as a result of setting the shape of the base part so that the first pressing force is 1.4 or less, it is possible to suppress the inadequate deformation (impairment of insertability of the cleaning part into the back of the interdental space) when the base part is further inserted in the present posture thereof toward the back of the oral cavity from the state in which the tip-side portion is in contact with the outer surface of the back teeth. Further, as a result of setting the shape of the base part so that the second pressing force is 0.5 N or more, the tip-side portion is effectively supported by the grip part-side portion so as to allow for flexural deformation of the tip-side portion, and the elastic restoring force of the base part during the insertion of the cleaning part in the space between the back teeth (the force pressing the cleaning part against the outer surface of the back teeth), that is, the cleaning property of the interdental space or the back teeth is sufficiently ensured. Furthermore, since the shape of the base part is set such that the second pressing force is 2.5 N or less, the elastic restoring force of the base part is prevented from becoming too large. Therefore, the cleaning part is easily inserted to the back of the space between the back teeth, thereby effectively cleaning the interdental space or the back teeth.

In this case, it is preferred that the shaft part have a shape that can be deformed at any point of an intermediate portion located between the insertion end section and the base end section of the shaft part so as to allow the displacement of the insertion end section at least between the steady-state posture in which no external force acts on the shaft part and the curved posture in which the angle between the first straight line connecting the deformed point of the intermediate portion and the insertion end section and the second straight line connecting the deformed point of the intermediate portion and the base end section is 90 degrees.

In this way, when the base part is further inserted in the present posture thereof toward the back of the oral cavity from the state in which the tip of the cleaning part is in contact with the outer surface of the back teeth, breakage of the shaft part is suppressed. Therefore, the insertion of the base part makes it possible to insert the cleaning part to the back of the space between the back teeth. Specifically, when the cleaning part is further inserted into the space between the back teeth from the state in which the tip of the cleaning part is in contact with the outer surface of the back teeth, since the angle formed by the first straight line and the second straight line is about 90 degrees, by setting the shape of the shaft part to be deformable so as to allow the displacement of the insertion end section between the steady-state posture and the curved posture at any point of the intermediate portion, it is possible to insert the cleaning part to the back of the space between the back teeth while suppressing the breakage of the shaft part.

Further, in the present cleaning instrument, it is preferred that the shape of the grip part be set such that buckling occurs in the shaft part when a compressive load is applied to the base part from both sides in the axial direction, and the cleaning part have a shape that covers the maximum displacement portion of the shaft part in which the amount of displacement from an initial position of the center axis of the shaft part before buckling of the shaft part, in the axially perpendicular direction is at a maximum when the buckling occurs in the shaft part.

In this way, even when the shaft part is broken at the maximum displacement portion as a result of buckling of the shaft part during cleaning of the interdental space, since the maximum displacement portion is covered by the cleaning part, the portion of the shaft part between the maximum displacement portion and the insertion end section is prevented from being detached from other portions of the base part. Thus, even when buckling occurs in the shaft part during the cleaning of the interdental space, a part of the shaft part is prevented from remaining in the oral cavity.

In this case, it is preferred that the shaft part be formed in shape such that the maximum displacement portion is located between a portion of the shaft part which is spaced 1.0 mm apart from the insertion end section toward the base end section side and a portion of the shaft part which is spaced 9.0 mm apart from the insertion end section toward the base end section side.

In this way, even when buckling occurs in the shaft part during cleaning of the interdental space, the interdental space can be cleaned by the portion of the cleaning part that covers the portion between the maximum displacement portion and the insertion end section in the shaft part.

The invention claimed is:

1. An interdental cleaning instrument comprising:
   a base part having a shape extending from a base end to an insertion end section in an axial direction of the interdental cleaning instrument, and having a first hardness; and
   a cleaning part that is composed of an elastomer having a second hardness lower than the first hardness of the base part, covers at least a portion of the base part from the insertion end section, and is capable of cleaning an interdental space, wherein
   the base part has:
      a grip part that extends from the base end along the axial direction and has a shape to receive a grasp of fingers; and
      a shaft part which has a shape that is insertable to an interdental space between neighboring teeth, and has the insertion end section and a base end section at which the grip part is connected to the shaft part;
   the shaft part has a shape that can be flexurally deformed to displace the insertion end section in a direction which is perpendicular to the axial direction of the shaft part with respect to the base end section;
   the cleaning part has a shape that covers the insertion end section to form a tip end of the cleaning part and a portion of the shaft part extending from the insertion end section by a length equal to or less than the entire axial dimension of the shaft part;

the base part has an in the axial dimension of 35 mm or more; and the shape of the base part is set to obtain a first pressing force ranged from 0.3 N to 1.4 N to cause 10 mm of displacement at a first portion distant by 2.5 mm from the tip end of the cleaning part when the first pressing force is applied to the first portion in a state in which the interdental cleaning instrument is fixedly held at a portion 10 mm apart from the tip end of the cleaning part to the grip part side; and a second pressing force ranged from 0.5 N to 2.5 N to cause 10 mm of displacement at a second portion distant by 8.0 mm from the tip end of the cleaning part when the second pressing force is applied to the second portion in a state in which the interdental cleaning instrument is fixedly held at a portion 35 mm apart from the tip end of the cleaning part to the grip part side.

2. The interdental cleaning instrument according to claim 1, wherein the shaft part as a shape that allows a displacement of the insertion end section at a point of an intermediate portion located between the insertion end section and the base end section of the shaft part between a steady-state posture in which no external force acts on the shaft part and a curved posture in which an angle between a first straight line connecting the deformed point of the intermediate portion and the insertion end section and a second straight line connecting the deformed portion of the intermediate portion and the base end section is 90 degrees.

3. The interdental cleaning instrument according to claim 1, wherein the grip part has such a shape that buckling occurs in the shaft part when a compressive load is applied to the base part from both sides in the axial direction; and the cleaning part covers a maximum displacement portion of the shaft part at which the maximum amount of displacement from an initial position of a center axis of the shaft part occurs during buckling of the shaft part.

4. The interdental cleaning instrument according to claim 3, wherein the maximum displacement portion is located between a portion of the shaft part which is at 1.0 mm apart from the insertion end section toward the base end section side and a portion of the shaft part which is at 9.0 mm apart from the insertion end section toward the base end section side.

* * * * *